United States Patent
Laddu et al.

(10) Patent No.: US 12,231,877 B2
(45) Date of Patent: Feb. 18, 2025

(54) SECURITY KEY GENERATION IN WIRELESS NETWORKS

(71) Applicant: NOKIA TECHNOLOGIES OY, Espoo (FI)

(72) Inventors: Keeth Saliya Jayasinghe Laddu, Espoo (FI); Laddu Praneeth Jayasinghe, Piliyandala (LK)

(73) Assignee: NOKIA TECHNOLOGIES OY, Espoo (FI)

( * ) Notice: Subject to any disclaimer, the term of this patent is extended or adjusted under 35 U.S.C. 154(b) by 360 days.

(21) Appl. No.: 17/766,040

(22) PCT Filed: Oct. 4, 2019

(86) PCT No.: PCT/EP2019/076896
§ 371 (c)(1),
(2) Date: Apr. 1, 2022

(87) PCT Pub. No.: WO2021/063518
PCT Pub. Date: Apr. 8, 2021

(65) Prior Publication Data
US 2022/0338002 A1    Oct. 20, 2022

(51) Int. Cl.
*H04W 12/041* (2021.01)
*H04L 9/08* (2006.01)

(52) U.S. Cl.
CPC ......... *H04W 12/041* (2021.01); *H04L 9/0875* (2013.01)

(58) Field of Classification Search
CPC ............. H04L 2209/80; H04L 9/0875; H04W 12/041
See application file for complete search history.

(56) References Cited

U.S. PATENT DOCUMENTS

| 2012/0317417 | A1* | 12/2012 | Hennebert | ............ | H04L 9/0875 |
| | | | | | 713/171 |
| 2014/0082360 | A1* | 3/2014 | Laitinen | ................ | H04L 63/061 |
| | | | | | 713/168 |
| 2016/0226845 | A1* | 8/2016 | Kim | ...................... | H04W 12/04 |

(Continued)

FOREIGN PATENT DOCUMENTS

| CN | 105553649 A | 5/2016 |
| CN | 108183792 A | 6/2018 |

(Continued)

OTHER PUBLICATIONS

International Search Report and Written Opinion dated Jun. 26, 2020 corresponding to International Patent Application No. PCT/EP2019/076896.

(Continued)

*Primary Examiner* — Kashif Siddiqui
(74) *Attorney, Agent, or Firm* — Lippes Mathias LLP (57) ABSTRACT

According to an example aspect of the present invention, there is provided a method comprising, transmitting to a second wireless node timing information for security key adoption and information indicative of a third wireless node, transmitting to the third wireless node a message to estimate a channel between the second wireless node and the third wireless node, the message to estimate the channel comprising information indicative of the second wireless node and channel measurement resource information associated with the second wireless node, obtaining a security key generated on the basis of channel estimation information based on estimation of the channel by the third wireless node, and applying the security key for encrypted data transmission between the first wireless node and the second wireless node.

19 Claims, 6 Drawing Sheets

(56) References Cited

U.S. PATENT DOCUMENTS

| | | | |
|---|---|---|---|
| 2018/0013553 A1 | 1/2018 | Hassan | |
| 2018/0287757 A1 | 10/2018 | Onggosanusi | |
| 2019/0098497 A1 | 3/2019 | Shapira et al. | |
| 2020/0044840 A1* | 2/2020 | Chang | H04W 12/041 |
| 2020/0228327 A1* | 7/2020 | Zhang | H04L 9/0825 |

FOREIGN PATENT DOCUMENTS

| | | | | |
|---|---|---|---|---|
| CN | 109246694 A | | 1/2019 | |
| CN | 111325352 B | * | 2/2021 | G06F 16/9535 |
| DE | 102014221881 A1 | | 4/2016 | |
| DE | 102015210537 A1 | | 12/2016 | |
| WO | 2013/093171 A1 | | 6/2013 | |
| WO | WO 2017/163160 A1 | | 9/2017 | |
| WO | 2018/155884 A1 | | 8/2018 | |
| WO | 2018/182520 A1 | | 10/2018 | |

OTHER PUBLICATIONS

Yiliang Liu et al., "Physical Layer Security for Next Generation Wireless Networks: Theories, Technologies, and Challenges," IEEE Communications Surveys & Tutorials, vol. 19, No. 1, First Quarter Mar. 31, 2017, XP011641661.

Office action received for corresponding Chinese Patent Application No. 201980101074.5, dated Jan. 30, 2024, 7 pages of office action and no page of translation available.

Shuaifang et al., "Relay Cooperative Secret Key Generation for Quasi-static Channels in Internet of Things", Journal of Electronics & Information Technology, vol. 40, No. 1, Jan. 2018, pp. 50-56.

Xuxing et al., "A key generation scheme for wireless communication based on channel characteristics", Journal of Terahertz Science and Electronic Information Technology, vol. 15, No. 5, Oct. 2017, pp. 834-840.

* cited by examiner

SECURITY KEY GENERATION IN WIRELESS NETWORKS

FIELD

Various example embodiments relate in general to wireless networks and more specifically, to improved security key generation in such networks, particularly for physical layer security arrangements.

BACKGROUND

Modern cryptography may be divided into two schools, comprising information-theoretic and complexity-based security. Traditionally, only complexity-based security has been used while the use of information-theoretic cryptography has been limited, if any. Information-theoretic cryptography is based on insufficiency of information and hence it does not depend on computational hardness. In other words, information-theoretic cryptography may ensure secure communication, even if unlimited computing power would be available. Information-theoretic cryptography may be considered as unbreakable from the cryptanalytic point of view, because typically there is not enough information for an adversary to break the encryption. The use of information-theoretic cryptography is therefore desirable in many applications.

Physical-Layer Security, PLS, may be seen as one of form information-theoretic cryptography, and PLS may be used to complement and improve security of communications in wireless networks. Using PLS, intrinsic randomness of a wireless transmission channel, i.e. uniqueness of the wireless channel between two physical positions in space and time, may be exploited to guarantee secure communications.

More recently, a need to design new and robust security protocols based on PLS has arisen, because application level security may not be efficient and secure enough for emerging wireless communication systems. PLS may be used as an additional level of protection on top of, or instead of, conventional security schemes. Thus, it would be desirable to exploit PLS to form a well-integrated security solution for wireless communication networks. There is therefore a need for improvements to enable secure communications in wireless networks by exploiting PLS.

SUMMARY OF THE INVENTION

According to some aspects, there is provided the subject-matter of the independent claims. Some embodiments are defined in the dependent claims.

According to a first aspect, there is provided an apparatus comprising means for transmitting to a second wireless node timing information for security key adoption and information indicative of a third wireless node, transmitting to the third wireless node a message to estimate a channel between the second wireless node and the third wireless node, the message to estimate the channel comprising information indicative of the second wireless node and channel measurement resource information associated with the second wireless node, obtaining a security key generated on the basis of channel estimation information based on estimation of the channel by the third wireless node, and applying the security key for encrypted data transmission between the first wireless node and the second wireless node.

According to a second aspect of the present invention, there is provided an apparatus comprising means for receiving, from a first wireless node, timing information for security key adoption and information indicative of a third wireless node, receiving channel measurement resource information associated with the third wireless node, receiving a trigger message to estimate a channel between the second wireless node and the third wireless node, generating channel estimation information on the basis of estimation of the channel in response to the received trigger message and on the basis of the received channel measurement resource information, generating a security key on the basis of the channel estimation information, and applying the security key for encrypted data transmission between the first wireless node and the second wireless node in accordance with the received timing information for security key adoption.

According to a third aspect, there is provided an apparatus comprising means for receiving from a first wireless node a message to estimate a channel between the second wireless node and the third wireless node, the message to estimate the channel comprising information indicative of the second wireless node and channel measurement resource information associated with the second wireless node, transmitting, on the basis of the received channel measurement resource information, a reference signal to the second wireless node for directional or omnidirectional channel sensing to estimate the channel between the second wireless node and the third wireless node, generating channel estimation information on the basis of estimation of the channel, and transmitting the channel estimation information to the first wireless node for generating a security key for encrypting data between the first wireless node and the second wireless node or transmitting to the first wireless node the security key generated by the first wireless device on the basis of the channel estimation information.

According to a fourth aspect, there is provided a first method for a first wireless node, comprising transmitting to a second wireless node timing information for security key adoption and information indicative of a third wireless node, transmitting to the third wireless node a message to estimate a channel between the second wireless node and the third wireless node, the message to estimate the channel comprising information indicative of the second wireless node and channel measurement resource information associated with the second wireless node, obtaining a security key generated on the basis of channel estimation information based on estimation of the channel by the third wireless node, and applying the security key for encrypted data transmission between the first wireless node and the second wireless node.

According to a fifth aspect, there is provided a second method for a second wireless node, comprising receiving, from a first wireless node, timing information for security key adoption and information indicative of a third wireless node, receiving channel measurement resource information associated with the third wireless node, receiving a trigger message to estimate a channel between the second wireless node and the third wireless node, generating channel estimation information on the basis of estimation of the channel in response to the received trigger message and on the basis of the received channel measurement resource information, generating a security key on the basis of the channel estimation information, and applying the security key for encrypted data transmission between the first wireless node and the second wireless node in accordance with the received timing information for security key adoption.

According to a sixth aspect, there is provided there is provided a second method for a third wireless node, comprising receiving from a first wireless node a message to estimate a channel between the second wireless node and the third wireless node, the message to estimate the channel comprising information indicative of the second wireless node and channel measurement resource information associated with the second wireless node, transmitting, on the basis of the received channel measurement resource information, a reference signal to the second wireless node for directional or omnidirectional channel sensing to estimate the channel between the second wireless node and the third wireless node, generating channel estimation information on the basis of estimation of the channel, and transmitting the channel estimation information to the first wireless node for generating a security key for encrypting data between the first wireless node and the second wireless node or transmitting to the first wireless node the security key generated by the first wireless device on the basis of the channel estimation information.

According to some aspects, an apparatus comprising at least one processing core, at least one memory including computer program code, the at least one memory and the computer program code being configured to, with the at least one processing core, cause the apparatus at least to perform the method of any preceding aspects or an embodiment thereof.

According to some further aspects, there is provided non-transitory computer readable medium having stored thereon a set of computer readable instructions that, when executed by at least one processor, cause an apparatus to at least perform the method of any preceding aspects or an embodiment thereof.

According to still further aspects, there is provided a computer program configured to perform the the method of any preceding aspects or an embodiment thereof.

EMBODIMENTS

Figure 1:
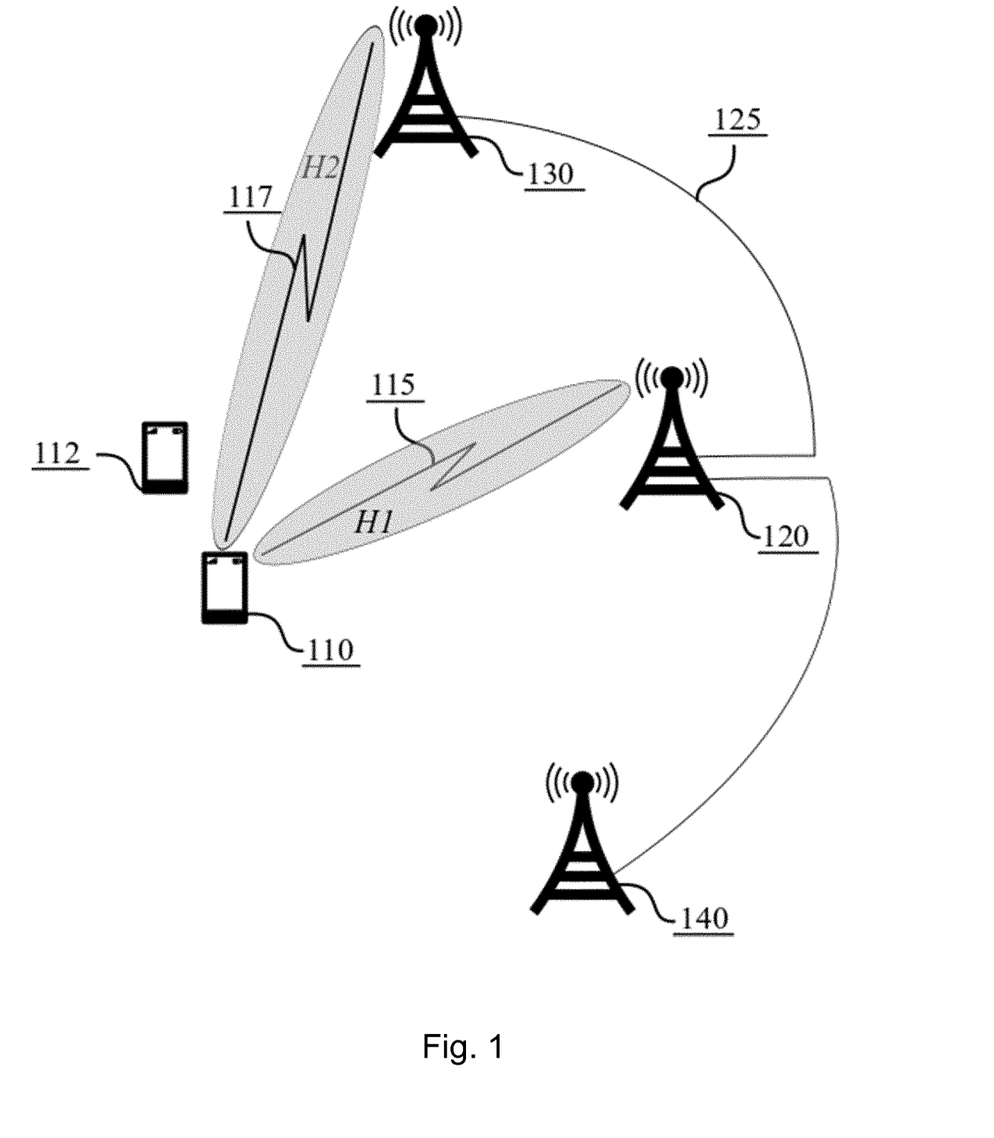
FIG. 1 illustrates an example network scenario in accordance with at least some embodiments.

FIG. 1 illustrates an example network scenario, comprising wireless terminal 110 and a plurality of wireless network nodes 120, 130 and 140.

Wireless terminal 110 may comprise, for example, a User Equipment, UE, a smartphone, a cellular phone, a Machine-to-Machine, M2M, node, machine-type communications node, an Internet of Things, IoT, node, a car telemetry unit, a laptop computer, a tablet computer or, indeed, any kind of suitable wireless user device or mobile station, i.e., a terminal.

Wireless terminal 110 may be attached, or connected to, wireless network node 120 over air interface for wireless communications. Wireless network node 120 may be considered for example as a serving base station (BS), of first wireless terminal 110. In general, wireless terminal 110 and wireless network nodes 120-140 may be referred to as wireless nodes. For instance, wireless network node 120 may be referred to as a first wireless node, wireless terminal 110 may be referred to as a second wireless node, and wireless network node 130 as third wireless node.

Air interface between wireless terminal 110 and wireless network node 120 may be configured in accordance with a Radio Access Technology, RAT, which both first wireless terminal 110 and wireless network node 120 are configured to support. Air interface may comprise, e.g., one or more beams between first wireless terminal 110 and wireless network node 120. Examples of cellular RATs include Long Term Evolution, LTE, New Radio, NR, which may also be known as fifth generation, 5G, and MulteFire. On the other hand, example of non-cellular RATs includes Wireless Local Area Network, WLAN.

In case of cellular RATs, wireless network node 120-140 may be referred to as a BS and wireless terminals may be referred to as UEs. For example, in the context of LTE, wireless node 120-140 may be referred to as eNB while in the context NR, wireless node 120-140 may be referred to as gNB. On the other hand, for example in the context of WLAN, wireless node 120-140 may be referred to as an access point. In any case, embodiments of the present invention are not restricted to any particular wireless technology. Instead, embodiments of the present invention may be exploited in any wireless communication system wherein it is desirable to perform secure communications.

Wireless network node 120 may be connected to other network nodes 130, 140, via wired or wireless connection 125. Wireless network nodes 120-140 may be connected, directly or via at least one intermediate node, with core network (not shown in FIG. 1), such as a Next Generation core network, Evolved Packet Core (EPC), or other network management element.

Wireless access network and/or core network may comprise various network functions. A network function in the present application may refer to an operational and/or physical entity. The network function may be a specific network node or element, or a specific function or set of functions carried out by one or more entities, such as virtual network elements. Examples of such network functions include a radio access or resource control or management function, mobility management or control function, session management or control function, interworking, data management or storage function, authentication function or a combination of one or more of these functions. Core network may be, in turn, coupled with another network, via which connectivity to further networks may be obtained, for example via a worldwide interconnection network.

A potential eavesdropper in the network, illustrated by terminal device 112, may try to intercept and decode the data transmissions 115 between wireless terminal 110 and wireless network node 120.

In general, evolution of wireless communications poses new challenges for privacy and security. The security mechanisms used at the moment are typically based on classical cryptography. Classical cryptography may not be suitable for IoT communications. IoT devices typically have limited resources, such as processing power, communication capabilities and battery, and thus the use of classical cryptography would often be unsuitable for IoT devices. As opposed to classical cryptography, wherein a security key is for example stored in a subscriber identity module (SIM) card or generated using a hash function stored in the SIM card, physical layer security (PLS) can be provided by applying physical layer measurable parameters in the secrecy key generation and protecting data with such a PLS key. Such physical, measurable variables may be referred to as statistics, quantities and attributes as well. Said physical, measurable variables may be estimated at both sides, at wireless terminal 110 and wireless network node 120, independently.

For example, if channel H1 is used by wireless terminal 110 and wireless network node 120, which assumed to be known only at wireless terminal 110 and wireless network node 120 (as that can be measured by sending reference signals), the security can be improved. However, when data transmissions may take over a long period of time, channel predictions at the eavesdroppers becomes more feasible with the use of a larger set of related information and by using machine learning algorithms. For example, a demodulation reference signal (DMRS) may be sent for each data transmission instance, and channel estimations with DMRS may become a feasible option. With the larger set of information available and predicting location of the wireless terminal 110, channel estimations can be predicted and estimated with greater accuracy. Also, the use of channel estimation is more or less applicable for time division duplex (TDD) schemes, where estimations at both sides should be more or less equal. Eavesdropper terminal 112 may thus be able to obtain much more information not only by network node 120, but also from wireless terminal 110.

Improvements are now provided for addressing these challenges, by providing a secret key establishment scheme, which may exploit measurements of channel between wireless terminal 110 and at least one further network node, such as third network node 130 and/or fourth network node 140. For example, PLS encryption key may be generated based on measurement on channel H2 based on communication 117 between the nodes 110 and 130.

Figure 2:
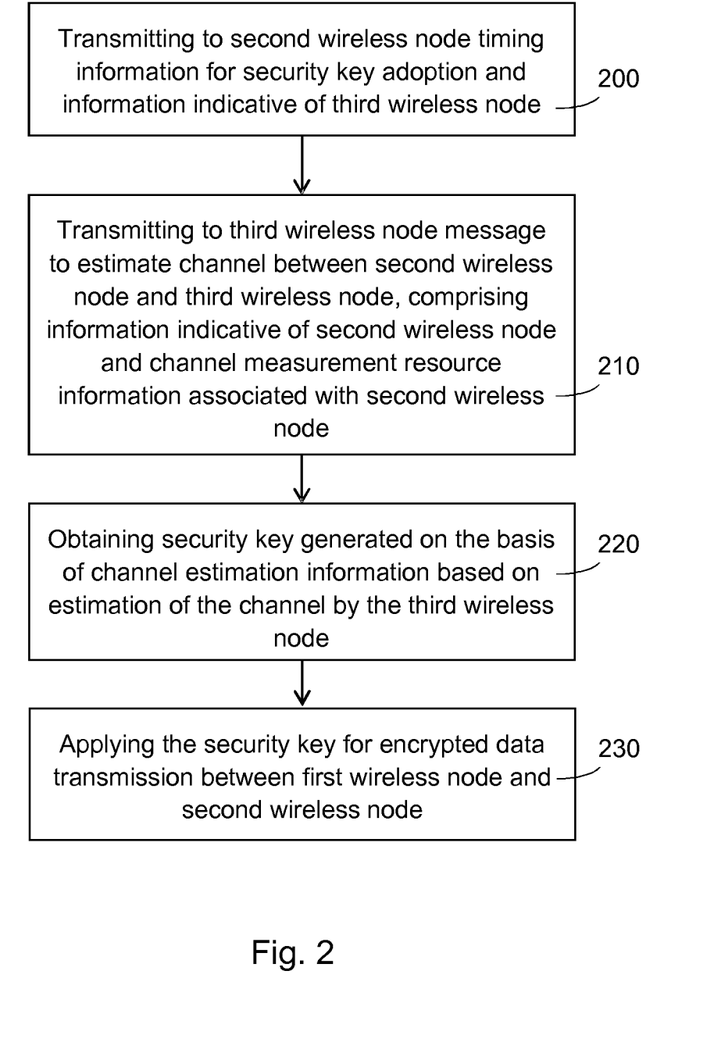
FIGS. 2 to 4 illustrate methods in accordance with at least some embodiments.

FIG. 2 illustrates a method for arranging secure communications between wireless nodes. The method may be applied by first wireless node or apparatus communicating with second wireless node, such as wireless network node 120 in communication with wireless terminal 110 or UE.

The method comprises transmitting 200 (from first wireless node) to a second wireless node timing information for controlling security key adoption and information indicative of third wireless node. A message to estimate a channel between second wireless node and third wireless node is transmitted 210 to third wireless node. The message may comprise information indicative of second wireless node and channel measurement resource information associated with second wireless node.

Block 220 comprises obtaining a security key generated on the basis of channel estimation information based on estimation of the channel by third wireless node. In some embodiments, block 220 comprises further steps of receiving from third wireless node channel estimation information based on estimation of the channel by third wireless node and generating the security key on the basis of the received channel estimation information. In an alternative embodiment, third wireless node is configured to generate the security key on the basis of the channel estimation information and block 220 comprises receiving the security key from third wireless node.

The security key is applied 230 for data transmission between first wireless node and second wireless node. Thus, the security key is used for encrypting the data and/or decrypting the data between first wireless node and second wireless node, i.e. as an encryption key and/or decryption key.

Figure 3:
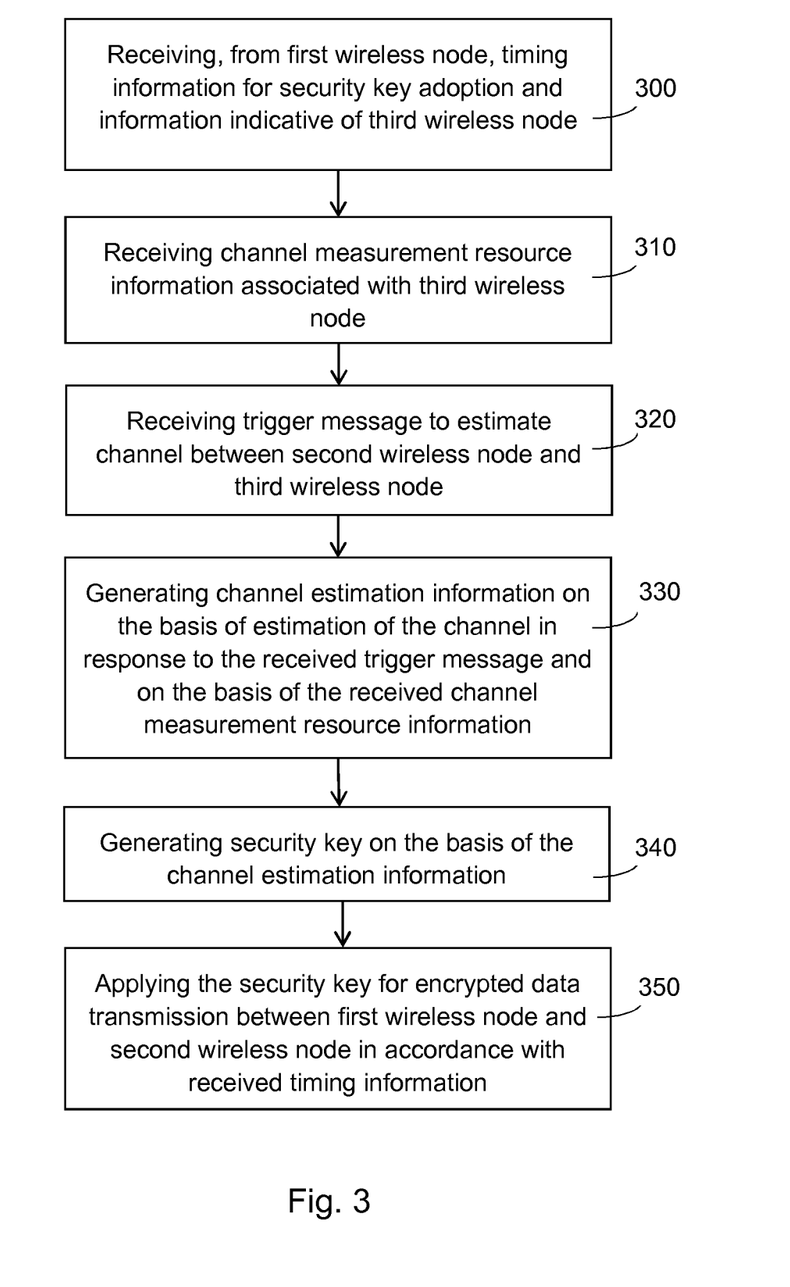

FIG. 3 illustrates a method for arranging secure communications between wireless nodes. The method may be applied by second wireless node or apparatus communicating with first wireless node, such as wireless terminal node 110 or UE in communication with wireless network node, such as first wireless network node 120.

The method comprises receiving 300, from first wireless node, timing information for security key adoption and information indicative of third wireless node. Block 310 comprises receiving channel measurement resource information associated with third wireless node.

A trigger message to estimate a channel between second wireless node and third wireless node is received 320. Channel estimation information is generated 330 on the basis of estimation of the channel in response to the received trigger message and on the basis of the received channel measurement resource information. The channel estimation may be generated on the basis of measurements on a reference signal from third wireless node.

A security key is generated 340 on the basis of the channel estimation information. The security key is applied 350, in accordance with the received timing information, for encrypted data transmission between first wireless node and second wireless node.

Figure 4:
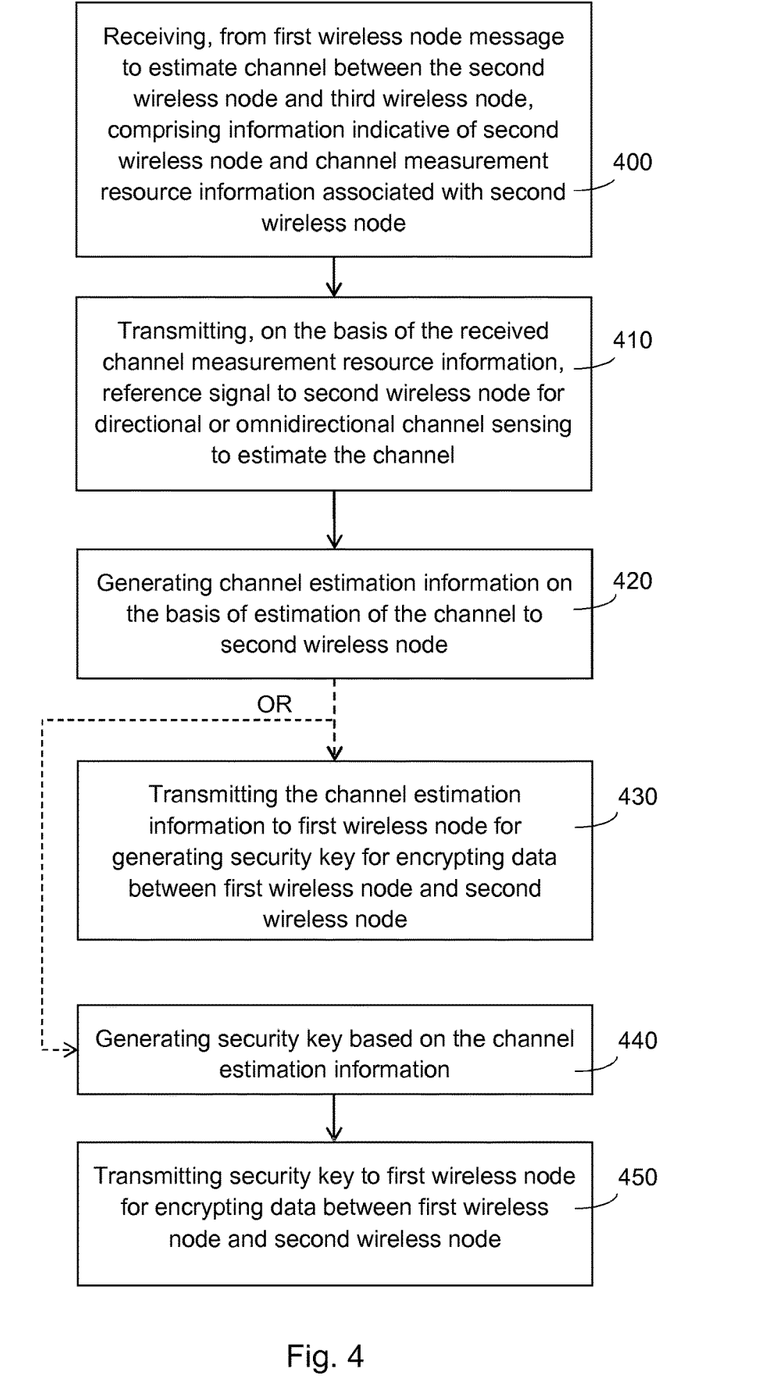

FIG. 4 illustrates a method for supporting security key generation for wireless nodes. The method may be applied by third wireless node, or apparatus or controller comprising or included in third wireless node, such as third wireless network node 130.

The method comprises receiving 400 from first wireless node a message to estimate a channel between second wireless node and third wireless node. The message may comprise information indicative of second wireless node and channel measurement resource information associated with second wireless node. A reference signal is transmitted 410, on the basis of the received channel measurement resource information, to second wireless node for directional or omnidirectional channel sensing to estimate the channel.

Channel estimation information is generated 420 on the basis of estimation of the channel in response to the received trigger message and on the basis of the received channel measurement resource information. For example, third wireless node may estimate the channel on the basis of a reference signal, such as a sounding reference signal, or a response message from second wireless node.

The channel estimation information is in some embodiments transmitted 430 to first wireless node for generating a security key for encrypting data between first wireless node and second wireless node. In some alternative embodiments, third wireless node generates 440 the security key and transmits 450 the security key to first wireless node.

It will be appreciated that various amendments may be performed and there may be further stages/blocks in the above disclosed method(s). It may be possible to perform at least some of the blocks in a different order. For example, in some embodiments the information of blocks 300 and 310 is received in a single message from first wireless node 120, but in another embodiment the channel measurement information is received from third wireless node 130. As another example, the trigger message may be transmitted and received from first wireless node to second wireless node 110 together with information in blocks 300 and 310. In a still another example variation, the trigger message of block 320 is received from third wireless node, e.g. with or by the reference signal. Some further example embodiments are now illustrated, with reference to example nodes of FIG. 1 and also with further references to 3GPP 5G system, without however limiting the disclosed features to such system.

In some embodiments, first wireless node 120 identifies, before block 200, a set of secondary wireless nodes that can be used to estimate channel to second node, the set comprising third wireless node. First wireless node 120 may send information indicative of the set of secondary wireless nodes to second node, e.g. in block 200.

First wireless node 120 may be configured to select, before block 200, third wireless node 130 among secondary wireless nodes in the set. The selection may be indicated for both second wireless node and third wireless node. Such selection step may be entered before or after block 200. Thus, block 200 or 210 may be entered in response to the selection.

Applied secondary wireless node may be identified or selected on the basis of location information of secondary wireless nodes and second wireless node, for example. The first wireless node may comprise a prediction algorithm, which may apply a machine learning model, configured to predict and/or select the applicable secondary node(s). In an embodiment, secondary wireless nodes are selected on the basis of radio channel measurement reporting from second wireless node. For example, initial or regular feedback from the UE on received signal quality, e.g. based on synchronization signal blocks (SSBs) reception. In a still another example embodiment, first wireless node configures UL reference signal transmission (or sweeping) to different directions and coordinates with other wireless nodes to learn the best secondary wireless nodes in terms of received channel quality.

The applied secondary wireless node may be selected within the set on the basis of random selection, such that an eavesdropper cannot predict it. In some other example embodiments, secondary wireless node may be selected within the set on the basis of channel quality and/or direction information of respective secondary wireless node. Thus, first wireless node may select secondary wireless node that is communicating (substantially) from a different direction than first wireless node. The applied secondary wireless node may be changed e.g. periodically and/or selected each time there is a need to generate a security key.

In another embodiment, a plurality of secondary wireless nodes is applied for generating or updating the security key between first wireless node 120 and the second wireless node 110. Thus, in addition to transmitting a first channel measurement configuration associated with third wireless node 130 to the second wireless node and to third wireless node, first wireless node may transmit a second channel measurement configuration associated with a fourth wireless node to the second wireless node and fourth wireless node in the set of secondary wireless nodes. First wireless node may transmit an indication to at least some of the secondary wireless nodes in the set to perform channel estimation for second wireless node. First wireless node may transmit a specific indication to second wireless node to perform the channel estimation with the plurality of secondary wireless nodes. Channel estimation information may be received from the plurality of secondary wireless nodes and the security key may be generate on the basis of at least some of the received channel estimation information from the set of secondary wireless nodes.

In some embodiments, first wireless node 120 transmits channel measurement resource information associated with third wireless node 130 to the second wireless node 110. This may be performed together with other information in block 300 or configured separately from block 300. In another embodiment, third wireless node transmits channel measurement resource information to the second wireless node after block 210.

The timing information for security key adoption may be a predefined parameter which may be configurable. The timing information may be dynamically determined on the basis of information of one or more of: backhaul latencies, propagation delays, and channel state information computation delays associated for performing the channel estimation between the second wireless node and third wireless node. This enables to ensure that second wireless node does not apply the security key too early. However, it will be appreciated that various other embodiments are also applicable for setting the encryption timing information to the second wireless node 110. It is also to be noted that the security key may be generated (and then directly taken into use) based on the timing information.

The security key may be generated 340, 440 based on the channel estimation information to encrypt a physical layer message in block 230, 350 according to a PLS method. The security key may be provided to a PLS ciphering module comprised by node 110, 120 and configured to encrypt and/or decrypt PLS encrypted messages.

It is to be appreciated that the present features may be applied in connection with a number of different PLS methods and PLS security keys. In some example embodiments, the security key is a scrambling sequence, where sequence is generated by a set of pre-defined steps, but at least some of the channel estimation information is used as input parameters to the steps to make that unique. In an embodiment, scrambling sequence generation can be initiated by components or parameters of the estimated channel between the second wireless node and third wireless node. For example, first wireless node 120 and the second wireless node 110 may be configured to obtain a long-term quantity among measurement information in the channel estimation information and adopt the quantity as a seed to a hash function to generate the security key.

Figure 5:
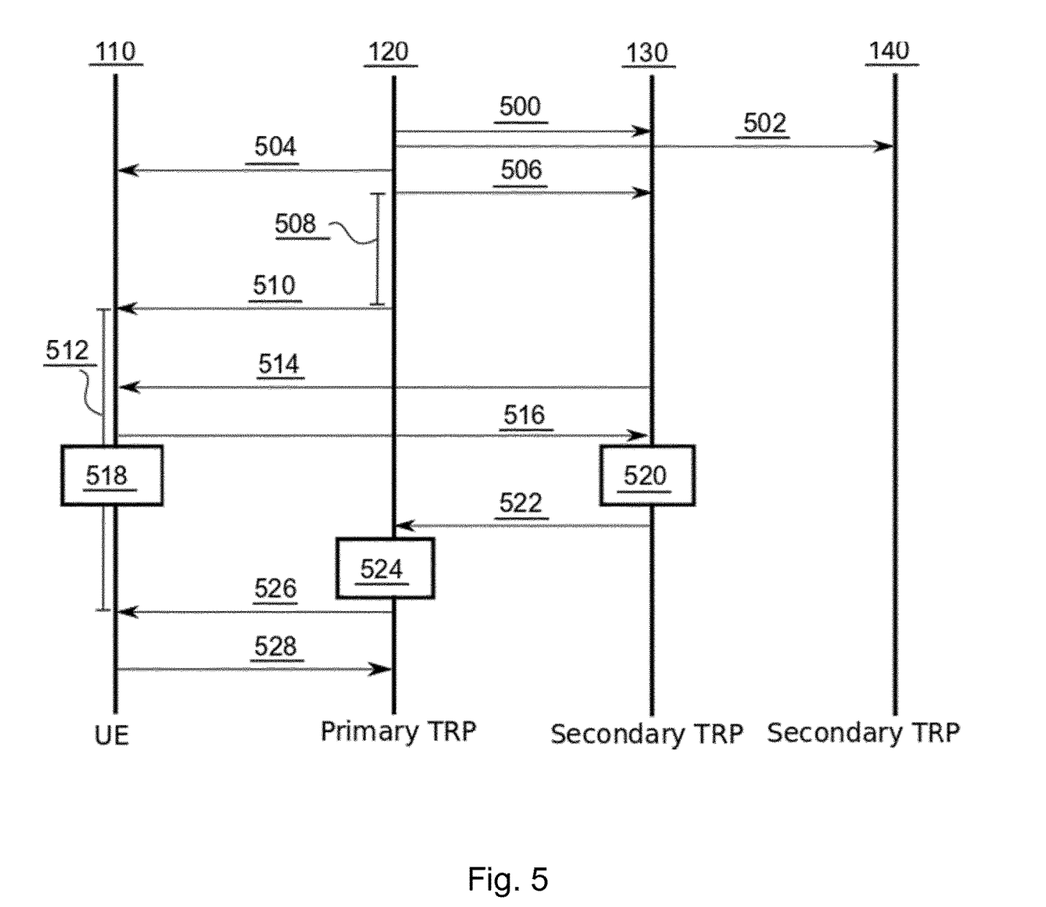
FIG. 5 illustrates a signaling example according to at least some embodiments.

Reference is made to FIG. 5 illustrating a signaling example according to some embodiments, with references to the example entities of FIG. 1. As indicated earlier, second wireless node 110 may be terminal node, such as UE and (first, third and fourth) wireless nodes 120-140 may be network nodes, such as base stations or gNBs, for example.

First wireless node 120 transmits a first channel measurement configuration (associated with third wireless node) to third wireless node 130 by message 500 and to the second wireless node 110 by message 504. First wireless node 120 also transmits a second measurement configuration (associated with fourth wireless node) to the second wireless node 110 by message 504 and to fourth wireless node 140 by message 502. It is to be noted that the configurations may be alternatively sent in separate messages to the second wireless node 110.

In some embodiments, channel estimation may be performed using channel state information-reference signals (CSI-RS) from third wireless node 130 to the second wireless node 110. CSI-RSs may be used by the second wireless node 110 to estimate a channel. Thus, the measurement configurations of messages 500, 502, 504 may comprise CSI-RS resource information.

In some embodiments, channel estimation may be performed at the secondary wireless node(s) 130, 140 based on sounding reference signals (SRS) transmitted by the second wireless node 110. Thus, the measurement configurations of messages 500, 502, 504 may comprise SRS resource information.

First wireless node 120 may be configured to transmit specific trigger messages to second wireless node 110 and the one or more secondary wireless nodes, i.e. at least third wireless node, to estimate the channel between the second wireless node and third wireless node. In the example of FIG. 5, first wireless node 120 selects third wireless node 130 to perform channel estimation information for security key generation purposes. Accordingly, a first trigger message 506 is transmitted to third wireless node 130 and a second trigger message 510 to second wireless node 110 to control estimation of the channel between nodes 110 and 130.

In an embodiment, after the transmission of the first trigger message 506 to third wireless node, first wireless node 120 activates a timer and applies a waiting time period 508 before transmitting the second trigger message 510. As long as second wireless node 110 is not receiving the first trigger message from first wireless node 120, it does not have to measure the channel or transmit a reference signal for third wireless node 130 for security key generation purpose.

In some embodiments, first wireless node 120 transmits channel estimation timing information to secondary nodes, such as third wireless node 130, for controlling timing of a reference signal from third wireless node to second wireless node for the estimation of the channel. This channel estimation timing information may be transmitted in the first trigger message 506, for example. In accordance with the channel estimation timing information, third wireless node 130 initiates channel measurement and may transmit a reference signal 514 for estimating the channel by second wireless node 110, such as a CSI-RS in accordance with the received CSI-RS resource information.

This enables to achieve appropriate timing of channel measurements by nodes 110 and 130. In another embodiment, instead of or in addition to the waiting time period 508, channel estimation timing information is included in the second trigger message 510, on the basis of which second wireless node 110 initiates channel measurement, e.g. adapts to receive CSI-RS message in accordance with the received channel measurement resource information.

Second wireless node 110 generates channel measurement information based on the received reference signal 514 and generates 518 a security key based on the channel measurement information. Second wireless node 110 also transmits a reference signal 516, such as a SRS, to third wireless node in accordance with the received first channel measurement configuration (504).

Third wireless node 130 receives the reference signal 516 and generates 520 channel measurement information based on the received reference signal 516. Third wireless node 130 transmits the channel measurement information 522 to first wireless node 110, which generates 524 a security key based on the received channel measurement information 522. Messages 526, 528 may then be transmitted between wireless nodes 110, 120 by applying the generate security keys.

The message 504 to second wireless node 110 may comprise timing information for the security key adoption. In some embodiments, the timing information for security key adoption indicates a time interval 512. Second wireless node may be configured to trigger a timer in response to the trigger message 510 and begin to use the security key (in block 350) only after the time interval 512 has passed.

Above-illustrated features may be applied, for example, in networks operating in accordance with 3GPP standards, such as in 5G/NR networks. In case of 5G NR, the presently disclosed features may be implemented by extending CSI framework defined in NR. CSI-RS may be used for a different cell to transmit CSI-RS and UE can measure them by associating to SSBs of that cell.

At least some of the above-illustrated messages may be 5G RRC messages. Above-illustrated information between to/from first wireless node 120 may be added as new information element(s) in existing control message(s) and/or a new message type may be specified. 3GPP 5G RRC message(s) may be applied between gNB and UE. For example, the message 504 may comprise CSI-ResourceConfig element and SRS-ResourceSet element for the resource information and the second trigger message 510 may comprise a DCI field CSI Request and a DCI field SRS request, which may be modified for the present purpose and include further information or element(s). 3GPP 5G Xn interface message(s) may be applied between gNBs.

As also indicated in the bottom of FIG. 5 as another option, above-illustrated features may be applied in connection with multiple transmission reception point (TRP) system comprising a primary TRP (which may operate as first wireless node 120 illustrated above) and a set of secondary TRPs (which may operate as third wireless node 130 and fourth wireless node 140 illustrated above). In such scenario, CSI-RS and SRS configurations may also be configured via RRC signaling to the UE and respective configurations being indicated to the secondary TRPs. The primary TRP may coordinate with the secondary TRPs when to transmit/receive CSI-RS and SRS. The primary TRP may also control the timing information for security key adoption to the UE such that it has enough time to measure the CSI, transmit SRS, generate a PLS key. For example, a secondary TRP1 may transmit CSI-RS, measure SRS and estimate the CSI based on the measured SRS. Then, the TRP1 feedbacks the estimated CSI to the primary TRP such that primary TRP can generate the PLS key. Once the PLS key is generated at both ends, the primary TRP and UE, the key is applied after the timing information for security key adoption. This procedure can further continue for another secondary TRP.

The present embodiments therefore facilitate a solution for physical layer encryption. More specifically, at least some embodiments provide a solution enable to further improve the security level, by making it more difficult for eavesdroppers to obtain information to obtain information to generate the security key.

By applying above-illustrated features, radio and power resources can be more optimally used, since secondary wireless nodes or TRPs may transmit the reference signals only upon need (at an appropriate time) to generate the security key, and UE does not measure them or transmit SRS unnecessarily. As data transmissions are not be carried with secondary wireless nodes or TRPs, the estimated channels are more secure to generate PLS keys and to provide the secrecy for the data transmissions between first or primary wireless node and second wireless node or UE.

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device), a base station, an access point or network node device or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 6:
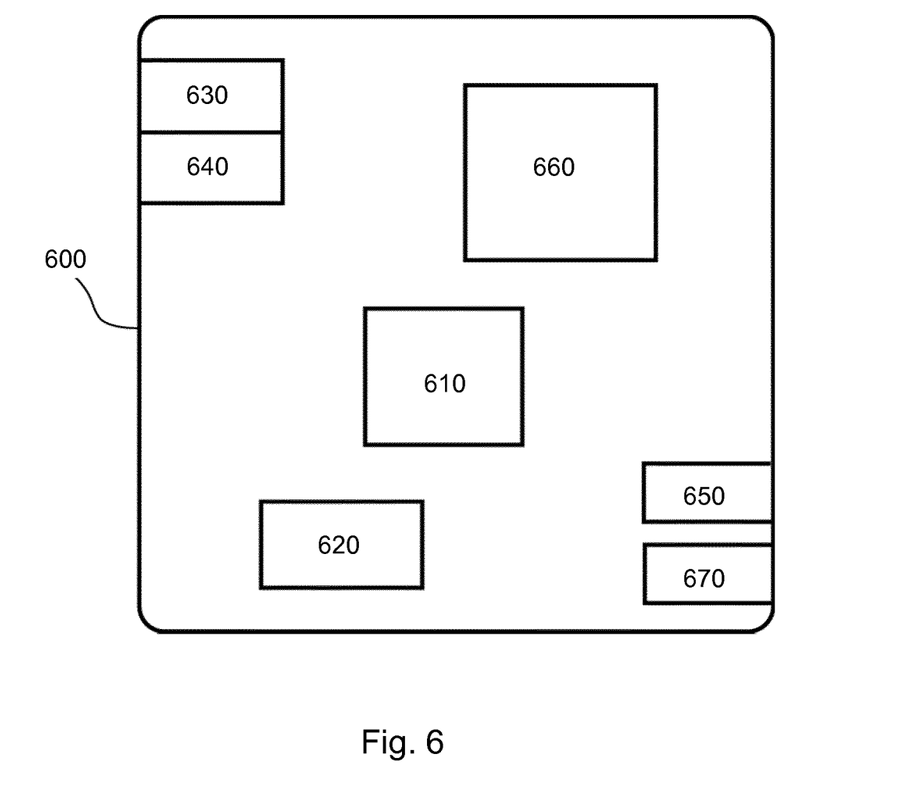
FIG. 6 illustrates an example apparatus capable of supporting at least some embodiments.

FIG. 6 illustrates an example apparatus capable of supporting at least some embodiments of the present invention. Illustrated is device 600, which may comprise, for example, first wireless terminal node 110, wireless network node 120 or 130 of FIG. 1, or device 600 may be configured to control the functioning thereof, possibly when installed therein. The apparatus may be configured to perform the method of FIG. 2, 3, or 4, or an embodiment thereof.

Comprised in device 600 is processor 610, which may comprise, for example, a single- or multi-core processor wherein a single-core processor comprises one processing core and a multi-core processor comprises more than one processing core. Processor 610 may comprise, in general, a control device. Processor 610 may comprise more than one processor. Processor 610 may comprise at least one application-specific integrated circuit, ASIC. Processor 610 may comprise at least one field-programmable gate array, FPGA. Processor 610 may be means for performing method steps in device 600. Processor 610 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 600 may comprise memory 620. Memory 620 may comprise random-access memory and/or permanent memory. Memory 620 may comprise at least one RAM chip. Memory 620 may comprise solid-state, magnetic, optical and/or holographic memory, for example. Memory 620 may be at least in part accessible to processor 610. Memory 620 may be at least in part comprised in processor 610. Memory 620 may be means for storing information. Memory 620 may comprise computer instructions that processor 610 is configured to execute. When computer instructions configured to cause processor 610 to perform certain actions are stored in memory 620, and device 600 overall is configured to run under the direction of processor 610 using computer instructions from memory 620, processor 610 and/or its at least one processing core may be considered to be configured to perform said certain actions. Memory 620 may be at least in part comprised in processor 610. Memory 620 may be at least in part external to device 600 but accessible to device 600. The memory may store parameters affecting the operation of the device, such as some or all of the functions illustrated above in connection with FIGS. 2 to 4.

Device 600 may comprise a transmitter 630. Device 600 may comprise a receiver 640. Transmitter 630 and receiver 640 may be configured to transmit and receive, respectively, information in accordance with at least one cellular or non-cellular standard. Transmitter 630 may comprise more than one transmitter. Receiver 640 may comprise more than one receiver. Transmitter 630 and/or receiver 640 may be configured to operate in accordance with Global System for Mobile communication, GSM, Wideband Code Division Multiple Access, WCDMA, 5G/NR, Long Term Evolution, LTE, IS-95, Wireless Local Area Network, WLAN, and/or Ethernet standards, for example.

Device 600 may comprise a near-field communication, NFC, transceiver 650. NFC transceiver 650 may support at least one NFC technology, such as NFC, Bluetooth, Wibree or similar technologies.

Device 600 may comprise user interface, UI, 660. UI 660 may comprise at least one of a display, a keyboard, a touchscreen, a vibrator arranged to signal to a user by causing device 600 to vibrate, a speaker and a microphone. A user may be able to operate device 600 via UI 660, for example to accept incoming telephone calls, to originate telephone calls or video calls, to browse the Internet, to manage digital files stored in memory 620 or on a cloud accessible via transmitter 630 and receiver 640, or via NFC transceiver 650, and/or to configured the operation of the device.

Device 600 may comprise or be arranged to accept a user identity module 670. User identity module 670 may comprise, for example, a subscriber identity module, SIM, card installable in device 600. A user identity module 670 may comprise information identifying a subscription of a user of device 600. A user identity module 670 may comprise cryptographic information usable to verify the identity of a user of device 600 and/or to facilitate encryption of communicated information and billing of the user of device 600 for communication effected via device 600.

Processor 610 may be furnished with a transmitter arranged to output information from processor 610, via electrical leads internal to device 600, to other devices comprised in device 600. Such a transmitter may comprise a serial bus transmitter arranged to, for example, output information via at least one electrical lead to memory 620 for storage therein. Alternatively to a serial bus, the transmitter may comprise a parallel bus transmitter. Likewise processor 610 may comprise a receiver arranged to receive information in processor 610, via electrical leads internal to device 600, from other devices comprised in device 600. Such a receiver may comprise a serial bus receiver arranged to, for example, receive information via at least one electrical lead from receiver 640 for processing in processor 610. Alternatively to a serial bus, the receiver may comprise a parallel bus receiver.

Device 600 may comprise further devices not illustrated in FIG. 6. For example, where device 600 comprises a smartphone, it may comprise at least one digital camera. Some devices 600 may comprise a back-facing camera and a front-facing camera, wherein the back-facing camera may be intended for digital photography and the front-facing camera for video telephony. Device 600 may comprise a fingerprint sensor arranged to authenticate, at least in part, a user of device 600. In some embodiments, device 600 lacks at least one device described above. For example, some devices 600 may lack a NFC transceiver 650 and/or user identity module 670.

Processor 610, memory 620, transmitter 630, receiver 640, NFC transceiver 650, UI 660 and/or user identity module 670 may be interconnected by electrical leads internal to device 600 in a multitude of different ways. For example, each of the aforementioned devices may be separately connected to a master bus internal to device 600, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

In an exemplary embodiment, an apparatus, such as, for example, first wireless terminal 110 or wireless network node 120, 130, may comprise means for carrying out the embodiments described above and any combination thereof.

In an exemplary embodiment, a computer program may be configured to cause a method in accordance with the embodiments described above and any combination thereof. In an example embodiment, a computer program product, embodied on a non-transitory computer readable medium, may be configured to control a processor to perform a process comprising the embodiments described above and any combination thereof.

In an example embodiment, an apparatus, such as, for example, first wireless terminal 110 or wireless network node 120, 130, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus for a first wireless node, said apparatus comprising:
   at least one processor; and
   at least one memory including computer program code, the at least one memory and the computer program code being configured to, with the at least one processor, cause the apparatus at least to perform:
      transmitting to a second wireless node timing information for security key adoption and information indicative of a third wireless node,
      transmitting to the third wireless node a message to estimate a channel between the second wireless node and the third wireless node, the message to estimate the channel comprising information indicative of the second wireless node and channel measurement resource information associated with the second wireless node,
      obtaining a security key generated on the basis of channel estimation information based on estimation of the channel by the third wireless node, and
      applying the security key for encrypted data transmission between the first wireless node and the second wireless node.

2. The apparatus of claim 1, wherein the at least one memory and computer program code are further configured, with the at least one processor, to cause the apparatus to perform:
   receiving from the third wireless node channel estimation information based on estimation of the channel by the third wireless node, and
   generating the security key on the basis of the received channel estimation information.

3. The apparatus of claim 1, wherein the at least one memory and computer program code are further configured, with the at least one processor, to cause the apparatus to perform receiving the security key from the third wireless node.

4. The apparatus of claim 1, wherein the at least one memory and computer program code are further configured, with the at least one processor, to cause the apparatus to perform repetitively identifying a set of secondary wireless nodes that can be used to estimate channel to the second node, the set comprising the third wireless node.

5. The apparatus of claim 4, wherein the at least one memory and computer program code are further configured, with the at least one processor, to cause the apparatus to perform transmitting information indicative of the set of secondary wireless nodes to the second node, selecting the third wireless node among the secondary wireless nodes in the set, and transmitting the message to estimate the channel to the third wireless node in response to the selection.

6. The apparatus of claim 4, wherein the at least one memory and computer program code are further configured, with the at least one processor, to cause the apparatus to perform:
- -transmitting a first channel measurement configuration associated with the third wireless node to the second wireless node and to the third wireless node,
- transmitting a second channel measurement configuration associated with a fourth wireless node to the second wireless node and the fourth wireless node in the set of secondary wireless nodes,
- transmitting to the wireless nodes in the set an indication to perform channel estimation for the second wireless node,
- receiving channel estimation information from the set of secondary wireless nodes, and
- generating the security key on the basis of at least some of the received channel estimation information from the set.

7. The apparatus of claim 1, wherein the at least one memory and computer program code are further configured, with the at least one processor, to cause the apparatus to transmit channel measurement resource information associated with the third wireless node to the second wireless node.

8. The apparatus of claim 1, wherein the at least one memory and computer program code are further configured, with the at least one processor, to cause the apparatus to perform transmitting a first trigger message to the third wireless node and a second trigger message to the second wireless node to estimate the channel between the second wireless node and the third wireless node.

9. The apparatus of claim 8, wherein the at least one memory and computer program code are further configured, with the at least one processor, to cause the apparatus to perform transmitting the second trigger message after a predetermined waiting time period after the transmission of the first trigger message to the third wireless node.

10. The apparatus of claim 1, wherein the at least one memory and computer program code are further configured, with the at least one processor, to cause the apparatus to perform transmitting channel estimation timing information to the third wireless node for controlling timing of a reference signal from the third wireless node to the second wireless node for the estimation of the channel.

11. The apparatus of claim 1, wherein the at least one memory and computer program code are further configured, with the at least one processor, to cause the apparatus to perform determining the timing information for security key adoption on the basis of information of one or more of: backhaul latencies, propagation delays, and channel state information computation delays associated for performing the channel estimation between the second wireless node and the third wireless node.

12. An apparatus for a second wireless node, said apparatus comprising:
- at least one processor; and
- at least one memory including computer program code, the at least one memory and the computer program code being configured to, with the at least one processor, cause the apparatus at least to perform:
  - receiving, from a first wireless node, timing information for security key adoption and information indicative of a third wireless node,
  - receiving channel measurement resource information associated with the third wireless node,
  - receiving a trigger message to estimate a channel between the second wireless node and the third wireless node,
  - generating channel estimation information on the basis of estimation of the channel in response to the received trigger message and on the basis of the received channel measurement resource information,
  - generating a security key on the basis of the channel estimation information, and
  - applying the security key for encrypted data transmission between the first wireless node and the second wireless node in accordance with the received timing information for security key adoption.

13. The apparatus of claim 12, wherein the at least one memory and computer program code are further configured, with the at least one processor, to cause the apparatus to perform receiving a channel state information reference signal from the third wireless node and transmitting a sounding reference signal to the third wireless node on the basis of the received channel measurement resource information.

14. The apparatus of claim 12, wherein the at least one memory and computer program code are further configured, with the at least one processor, to cause the apparatus to receive the trigger message and the channel measurement resource information associated with the third wireless node from the first wireless node.

15. The apparatus of claim 12, wherein the at least one memory and computer program code are further configured, with the at least one processor, to cause the apparatus to use the security key based on the channel estimation information for physical layer encryption to encrypt a physical layer message.

16. The apparatus of claim 12, wherein the timing information for security key adoption indicates a time interval, and wherein at least one memory and computer program code are further configured, with the at least one processor, to cause the apparatus to apply the security key after the time interval has lapsed since a trigger message from the first wireless node to the second wireless node to estimate the channel.

17. An apparatus for a third wireless node, comprising:
- at least one processor; and
- at least one memory including computer program code, the at least one memory and the computer program code being configured to, with the at least one processor, cause the apparatus at least to perform:
  - receiving from a first wireless node a message to estimate a channel between the second wireless node and the third wireless node, the message to estimate the channel comprising information indicative of the second wireless node and channel measurement resource information associated with the second wireless node, transmitting, on the basis of the received channel measurement resource information, a reference signal to the second wireless node for directional or omnidirectional channel sensing to estimate the channel between the second wireless node and the third wireless node, generating channel estimation information on the basis of estimation of the channel, and transmitting the channel estimation information to the first wireless node for generating a security key for encrypting data between the first wireless node and the second wireless node or transmitting to the first wireless node the security key generated by the first wireless device on the basis of the channel estimation information.

18. The apparatus of claim 1, wherein the channel measurement resource information comprises channel state information reference signal and/or sounding reference signal resource information associated with the third wireless node.

19. The apparatus of claim 1, wherein the first wireless node and the third wireless node is a gNB or a transmission reception point of a 5G radio network and the second wireless node is a user equipment.

* * * * *